(12) United States Patent
Martin

(10) Patent No.: US 6,331,279 B1
(45) Date of Patent: *Dec. 18, 2001

(54) OZONE GENERATING APPARATUS

(75) Inventor: Frank G. Martin, San Luis Obispo, CA (US)

(73) Assignee: Del Industries, Inc., CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,630

(22) Filed: Mar. 14, 2000

Related U.S. Application Data

(63) Continuation-in-part of application No. 09/257,745, filed on Feb. 25, 1999, now Pat. No. 6,129,850.
(60) Provisional application No. 60/090,771, filed on Jun. 26, 1998.

(51) Int. Cl.[7] .................. B01J 19/08; C02F 1/78
(52) U.S. Cl. ................ 422/186.07; 422/186.15; 210/760
(58) Field of Search .......... 422/186.07, 186.15; 210/760, 765

(56) References Cited

U.S. PATENT DOCUMENTS

| | | |
|---|---|---|
| 3,198,726 | 8/1965 | Trikilis . |
| 3,798,457 * | 3/1974 | Lowther ................. 422/186.07 |
| 4,352,740 * | 10/1982 | Grader et al. ............ 422/186.07 |
| 4,713,220 | 12/1987 | Huyah et al. . |
| 4,869,881 | 9/1989 | Collins . |
| 4,966,717 | 10/1990 | Kern . |
| 4,995,123 | 2/1991 | Kern . |
| 5,032,292 * | 7/1991 | Conrad ..................... 210/764 |
| 5,098,415 | 3/1992 | Levin . |
| 5,630,990 * | 5/1997 | Conrad et al. ............ 422/186.07 |
| 5,824,243 | 10/1998 | Contreras . |
| 5,834,031 | 11/1998 | Martin et al. . |

FOREIGN PATENT DOCUMENTS 7196521    8/1995   (JP) .

* cited by examiner

*Primary Examiner*—Kishor Mayekar
*Assistant Examiner*—Thao Tran

(57) ABSTRACT

Apparatus and methods for purifying the water in spas or hot tubs are provided. Such apparatus include an ozone generator sized and adapted to purify the water in a spa or jetted tub, the ozone generator including a chip electrode assembly adapted to produce ozone from air using an electric discharge, a power supply assembly, and a transfer assembly cooperating with said ozone generator to pass ozone produced by the ozone generator to the water in the spa or jetted tub. The chip electrode assembly is removably secured to and separately enclosed from the power supply assembly and is adapted to be easily, manually replaceable.

25 Claims, 5 Drawing Sheets

OZONE GENERATING APPARATUS

CROSS REFERENCE TO RELATED APPLICATIONS

This application is a continuation-in-part of U.S. patent application Ser. No. 09/257,745, filed Feb. 25, 1999, now U.S. Pat. No. 6,129,850 which claims the benefit of U.S. Provisional Application No. 60/090,771, filed Jun. 26, 1998.

BACKGROUND OF THE INVENTION

The present invention relates to systems of purifying waters used in spas and jetted tubs. More particularly, the invention relates to apparatus and methods specifically configured and adapted for the treatment, for example, for the purification, of waters used in spas and jetted tubs.

Spas, jetted (hot) tubs and the like are often treated with active compounds to maintain the water therein in a purified or sanitized condition. Compounds, such as chlorine and ozone, have been used to sanitize the relatively large volumes, for example, hundreds or thousands of gallons, of water in such spas, tubs, etc. As used herein, the terms "spa" and "jetted tub" refer to systems which hold or contain a body of liquid aqueous medium, hereinafter referred to as water, which is often heated, in a reservoir which is smaller than a swimming pool, but is sufficiently large so that an adult human being can be completely submerged or immersed in the water contained in the reservoir.

Spas are often used by submerging all or a major portion of one's body in the water in the reservoir for recreation and/or relaxation. Additional, separate purifying or sanitizing components are also included in spa waters to control bacteria, algae, etc., which are known to contaminate such waters. Very low concentrations of these active materials are used in order to avoid harming sensitive parts of the body—since such spas, tubs, etc. are sized so that the entire body can be immersed in the water and to minimize costs, because of the relatively large volume of water to be treated. For example, the normal (that is the typical, non-acute contamination) concentration of ozone used to purify or sanitize the water in a spa or tub is often in the range of about 0.005 to about 0.05 parts per million (ppm) based on weight of ozone per volume of water (w/v).

Typically, ozone is generated on site for use in purifying spa/tub waters. Conventional ozone generators used for such service include a sealed ultraviolet (UV) light lamp which is known to produce ozone in the desired amounts. Such conventional ozone generators are generally effective. However, these generators do have certain drawbacks. For example, the UV light lamp is relatively bulky, can burn out (often requiring system disassembly and lamp replacement) and are relatively inefficient in producing the desired amounts of ozone.

Therefore, it would be advantageous to provide new systems for purifying waters used in spas and jetted tubs.

SUMMARY OF THE INVENTION

New systems, for example, apparatus and methods, for purifying the waters in spas and jetted tubs have been discovered. The new systems employ ozone as the purifying/sanitizing component. The ozone is generated using an assembly which is compact, durable, convenient, reliable, requires little or no maintenance and generates ozone efficiently, for example, more efficiently than a conventional UV light lamp ozone generator. Such an ozone generator is particularly effective in producing purifying amounts of ozone for spas and jetted tubs used for recreation and/or relaxation. The owners of such spas and jetted tubs want to use these items when desired, want the water to be effectively purified/sanitized, but do not want to spend large amounts of time/money on maintenance. The systems of this invention meet these requirements.

In one broad aspect, the present apparatus for purifying the water in a spa or jetted tub comprise an ozone generator and a transfer assembly. The ozone generator is sized and adapted to purify the water in a spa or jetted tube, and includes a chip electrode assembly adapted to produce ozone from air using an electric discharge. The transfer assembly cooperates with the ozone generator to pass ozone produced by the ozone generator to the water in the spa or jetted tub.

Preferably, the ozone generator is effective to produce sufficient ozone to purify (sanitize) the water in a spa or jetted tub containing about 50 or about 200 to about 1000 or about 5000 gallons of water. The concentration of ozone in the water in the spa/jetted tub is generally as noted elsewhere herein. Two or more ozone generators in accordance with the present invention can be utilized together if larger volumes of water are to be treated.

In one particularly useful embodiment, the chip electrode assembly is adapted to produce ozone from air using a corona discharge. The ozone generator preferably further includes a transformer (an electrical transformer) sized, adapted and located to control the electric power (voltage) provided to the chip electrode assembly. Often, the ozone generator operates on conventional line voltage. For example, the transformer may be adapted to function by being provided with (to be inputted with) supply (e.g., line) A.C. electric power of about 100 to about 130 volts.

Alternatively, a 12 volt D.C. system may be employed to supply electric power.

One specific ozone generator useful in the present invention is the generator sold by Del Industries under the trademark ZO-CDS or CDS16. The specifications for the CDS16 ozone generator include power: 110–120 VAC, 50/60 Hz, 90 mA and 11 W; flow: 3 SCFH or 1415 cc/min; and weight: 12 oz or 340 g.

Any suitable transfer assembly may be utilized provided that it functions to cooperate with the ozone generator to pass ozone produced by the ozone generator to the water in the spa or jetted tub.

The transfer assembly preferably includes a water pump, an adductor assembly and a transfer conduit. The adductor (or venturi) assembly has an inlet and an outlet. The transfer conduit is adapted to provide a passage for ozone-containing gases between the ozone generator and the adductor assembly. The water pump is positioned to pump water from the spa or jetted tub through the adductor assembly. The transfer conduit is positioned so that the passage of water through the adductor assembly causes ozone-containing gases from the ozone generator to pass through the transfer conduit into and through the adductor assembly.

The water pump can be, and preferably is, the spa/jetted tub water pump, that is the pump used to circulate water in the spa/jetted tub. In one useful embodiment, the adductor assembly is located in a bypass conduit and a minor amount, that is less than about 50%, of the water being pumped by the water pump is passed through the bypass line.

The transfer assembly preferably includes a water transfer line which circulates water from and to the spa or jetted tub, a filter located upstream of the adductor assembly in fluid communication with the water transfer line and adapted to remove solid or particulate matter from the water passing through the water transfer line. The transfer assembly preferably further includes a heater adapted to heat the water flowing through the water transfer line upstream of the adductor assembly.

In one embodiment, the ozone transfer conduit is configured to reduce the probability of water passing from the adductor assembly to the ozone generator. This feature is designed to avoid detrimentally affecting the ozone generator. For example, the ozone transfer conduit may include a water trap. The ozone transfer conduit may include a loop (for example, a water trap loop), preferably located above the adductor assembly, to reduce the risk of water contacting the ozone generator. The ozone generator preferably is located above the water level in the spa/jetted tub. The present apparatus may include a check valve, for example, of conventional design, located in the ozone transfer conduit and adapted to prevent fluid flow in the ozone transfer conduit toward the ozone generator.

In another embodiment of the present invention, a water purifying apparatus for a spa or jetted tub is provided which comprises a removable, replaceable chip electrode. Preferably, an ozone generator in accordance with this embodiment, generally comprises a power supply assembly housed in a main housing or enclosure, and a chip electrode assembly, separately enclosed from, and removably coupled to, the power supply assembly.

More particularly, the chip electrode assembly includes a corona discharge chip electrode housed in a separate housing or enclosure having a body portion and a cover portion. The chip electrode assembly is removably coupled to the main enclosure which houses the power supply.

Importantly, electrical connectors providing electrical connection between the power supply and the chip electrode, are adapted to be easily disengaged, thus facilitating removal of the chip electrode assembly for replacement.

For example, each electrical connector comprises a electrical contact integrated with, or mounted on, the main enclosure and a cooperating electrical contact integrated with, or mounted on, the chip electrode enclosure. In the preferred embodiment, the electrical contact on the main enclosure may comprise one or more receptacles or pins, electrically wired to the transformer or power supply, and the electrical contact on the chip electrode enclosure may comprise one or more cooperating or complementary pins or receptacles electrically wired to the chip electrode. Contact surfaces of the integrated receptacles and pins may be made of copper or other suitable conductive material.

In addition, a manually manipulable fastener, such as a thumb screw or the like, may be provided for securing attachment of the chip electrode assembly to the main enclosure and securing electrical contact between the integrated pins and receptacles. Structure may be included for enabling the chip electrode assembly to be snapped in place.

The chip electrode will eventually become worn and less effective in producing ozone over time and through repeated use. With this specific embodiment hereinabove briefly described, the worn chip electrode assembly may safely and easily be removed and replaced with a new chip electrode assembly without need for a user/consumer to open the power supply enclosure or remove the ozone generator from its location. Replacement chip electrode assemblies in accordance with this embodiment may be made available at relatively low cost.

Methods for purifying/sanitizing waters located in spas and jetted tubs are included within the scope of the present invention. Preferably, these methods comprise employing the present apparatus to provide a purifying/sanitizing amount of ozone to the water located in the spa/jetted tub.

Any combination of two or more features described herein are included within the scope of the present invention provided that the features in each such combination are not mutually inconsistent.

These and other aspects and advantages of the present invention are apparent in the following detailed description and claims, particularly when considered in conjunction with the accompanying drawings in which like parts bear like reference numerals.

DETAILED DESCRIPTION OF THE PREFERRED EMBODIMENT

Figure 1:
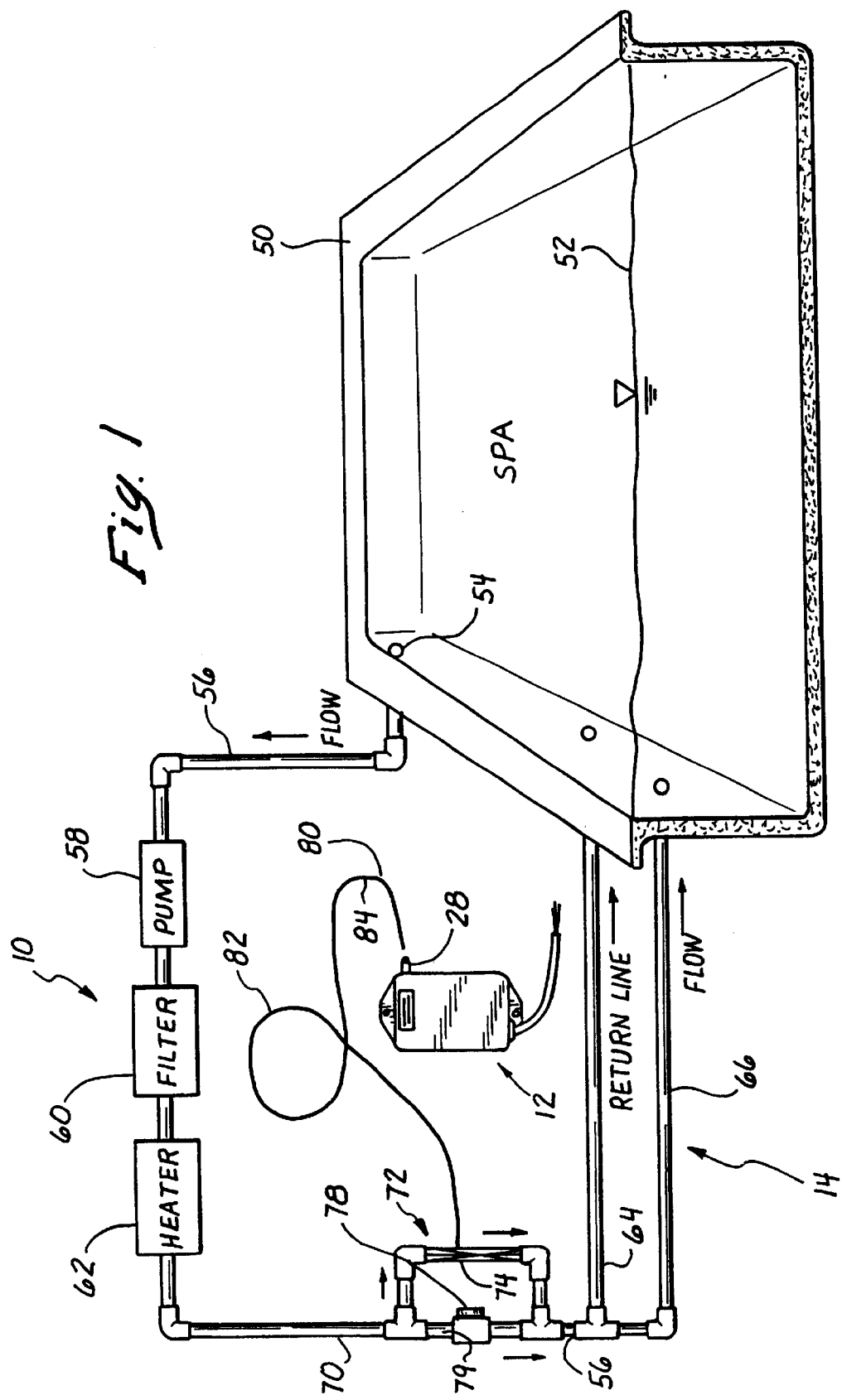
FIG. 1 is a generally schematic illustration showing an embodiment of the present invention in use in purifying the water in a spa.
Figure 3:
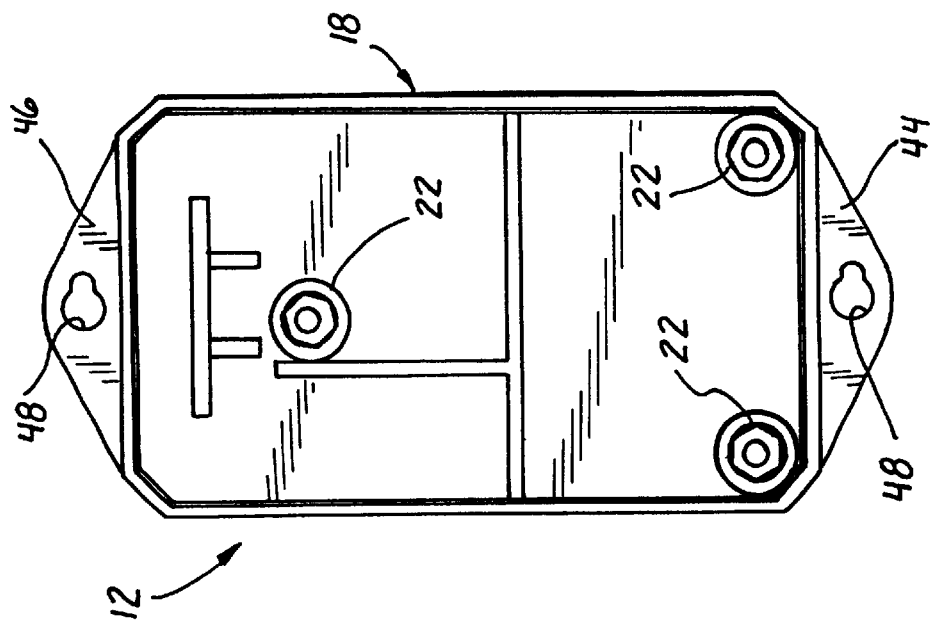
FIG. 3 is a plan view of the inner surface of the housing cover of the ozone generator used in the embodiment shown in FIG. 1.
Figure 2:
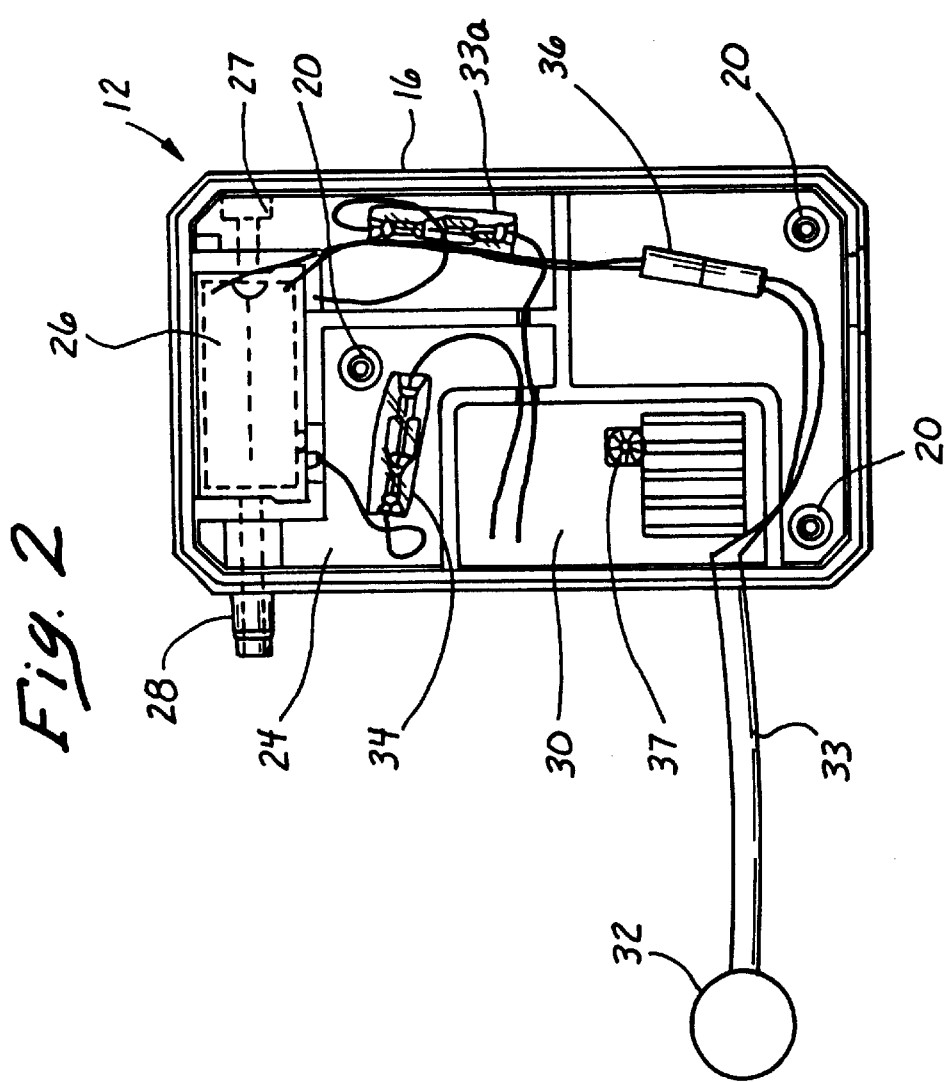
FIG. 2 is a plan view of the ozone generator used in the embodiment shown in FIG. 1 with the housing cover removed.
Figure 5:
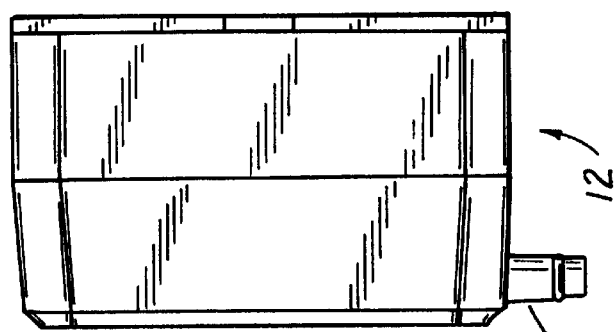
FIG. 5 is a side plan view of the ozone generator used in the embodiment in FIG. 1.
Figure 4:
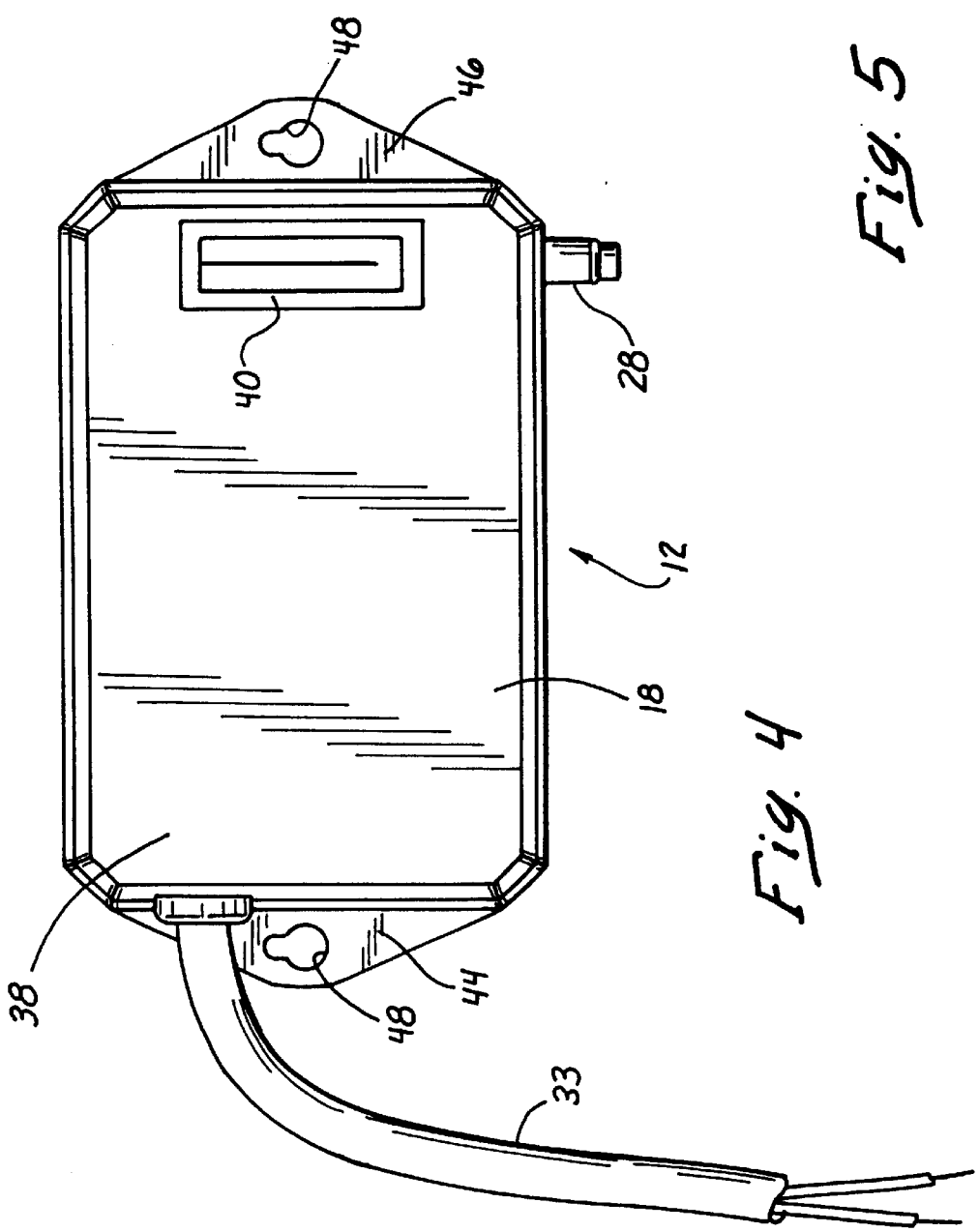
FIG. 4 is a top plan view of the ozone generator used in the embodiment in FIG. 1.

Referring now to the drawings, the present purification apparatus, shown generally at 10, includes an ozone generator, shown generally at 12, and a transfer assembly, shown generally at 14. Ozone generator 12 includes a housing body 16 and a housing cover 18 which is adapted to be joined or connected to the housing body by coupling threaded inserts 20 through complimentary cover holes 22 with threaded screws (not shown).

With housing cover 18 secured to housing body 18, ozone generator 12 is in the form of a compact, closed unit. Located within the space 24 between the housing body 16 and housing cover 18 is an ozone-producing corona discharge chip electrode 26. Ozone-containing gases produced from air, which enters housing body 16 through air inlet 27 in the housing, by chip electrode 26 exit the housing through housing outlet 28, which can be an integral part of the housing body 16. The air inlet may, and preferably does, include a particulate filter, for example, of conventional construction. Both the housing body 16 and housing cover 18 can be made from any suitable material or materials of construction. Preferably, these components are made of polymeric material. The ozone generator 12 typically has a length in a range of about 4 inches to about 10 inches, a width in a range of about 1 inch to about 6 inches and a thickness of about 0.5 inch to about 4 inches.

An electrical transformer 30, of conventional design, is included within space 24. Electrical transformer 30 processes line power, e.g., 120V, from source 32 through power cord 33 into power suitable for use by chip electrode 26. Transformer 30 is a "step up" transformer in that the chip electrode 26 uses power having a voltage in the range of about 3000 to about 5000 volts and a frequency in the range of about 18 KHz to about 20 KHz. A series of electrical connectors 33a, 34 and 36 are included within space 24 and are adapted to connect electric wires so as to provide electric power from source 32 ultimately to chip electrode 26. These connectors are adapted to be easily removed to allow maintenance of generator 12. A variable potentiometer 37 is provided and is used to control or adjust the ozone output of generator 12.

The top 38 of housing cover 18 includes a transparent window 40 through which the spa owner can visually observe chip electrode 26, which glows when ozone is being produced. This glow diminishes over time as the chip electrode 26 becomes less effective in producing ozone. Thus, the spa owner, by observing chip electrode 26, is provided with an indication as to when ozone generator 12 should be replaced. Atmospheric air from air inlet 27 is directed to come in contact with the chip electrode 26 to produce an ozone-containing gas which passes through housing outlet 28.

In addition, the housing cover 18 includes two end tabs 44 and 46, each of which includes a through hole 48 through which screws can be passed to secure the ozone generator 12 in place in a suitable stationary position.

Ozone generator 12 operates as shown in FIG. 1. Spa 50 includes a quantity of heated and circulating water 52, for example, about 500 to 1000 gallons in volume. The spa 50 is equipped with a water circulating system in which water from the spa passes through spa outlet 54 into conduit 56 through spa pump 58, spa filter 60 and spa heater 62. Eventually the pumped, filtered and heated water is passed back to the spa 50 through return lines 64 and 66.

In the present invention, piping segment 70 (a part of conduit 56), downstream of heater 62 is divided to provide a bypass line, shown generally at 72. Bypass line 72 includes a venturi assembly 74, of generally conventional construction, which acts as an ozone adductor to suction ozone-containing gases from ozone generator 12 into bypass line 72. The combined ozone-containing gases and water is returned to the main water conduit 56, as shown in FIG. 1. A valve 78, of conventional design, is located in water conduit 79 and can be adjusted to control the amount of water passed through bypass line 72. The ozone-containing gases from ozone generator 12 are passed through housing outlet 28 and through ozone conduit 80 into the water flowing through bypass line 72. The suction created by venturi assembly 74 causes ozone to flow through ozone conduit 80.

Ozone conduit 80 includes a water trap loop 82 located above venturi assembly 74. This water trap loop 82 acts to protect the ozone generator from being exposed to water in line 56 and bypass line 72. In addition, ozone conduit 80 includes a check valve 84, of conventional construction, which effectively prevents fluid flow in the ozone conduit back to the ozone generator 12. This feature inhibits, or even substantially prevents, any water from line 56 and bypass line 72 from entering ozone generator 12.

Apparatus 10 functions as follows. When it is desired to purify/sanitize the water 52 in spa 50, operation of the pump 58 and ozone generator 12 is initiated. This causes water 52 to flow from spa 50 through line 56 into pump 58, filter 60, heater 62 into piping segment 70. At this point, a minor amount, that is less than about 50%, of the total water passing through segment 70 is caused to flow through bypass line 72 and venturi assembly 74. This causes ozone-containing gases being generated by ozone generator 12 to pass through ozone conduit 80 into the water in bypass line 72, which is ultimately returned to the spa via return line 64 and 66.

Sufficient ozone is produced in accordance with the present invention to purify/sanitize the water 52 in spa 50 and/or to maintain such water in the desired purified/sanitized state.

Figure 6:
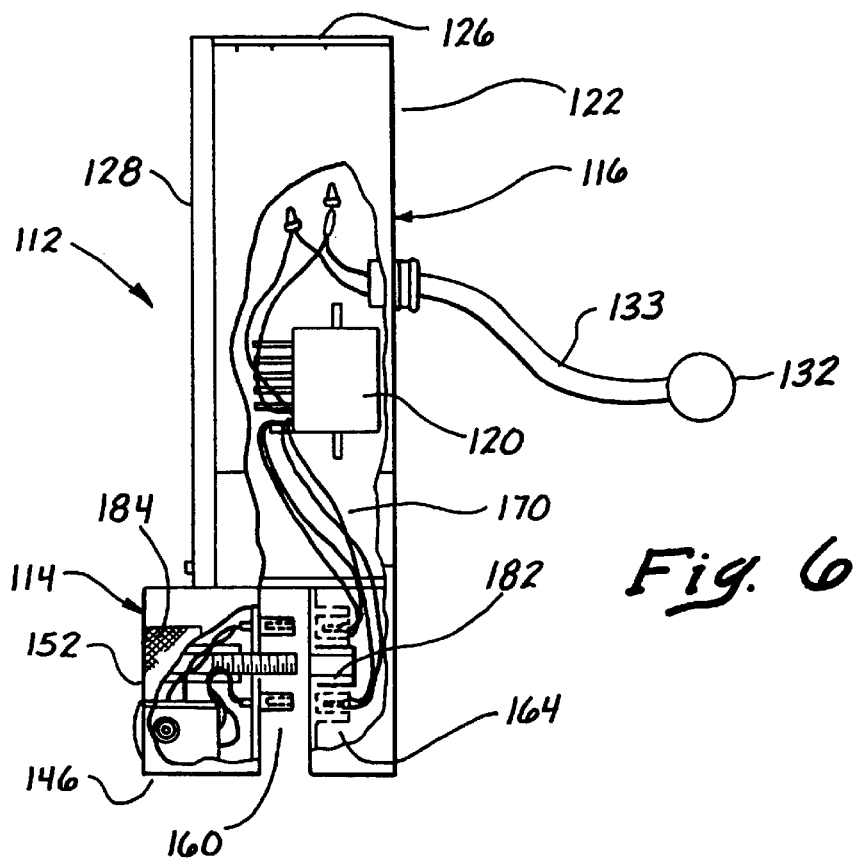
FIG. 6 is a partially cut away plan view of another embodiment of the present invention that includes a removable/replaceable flow cell.
Figure 7:
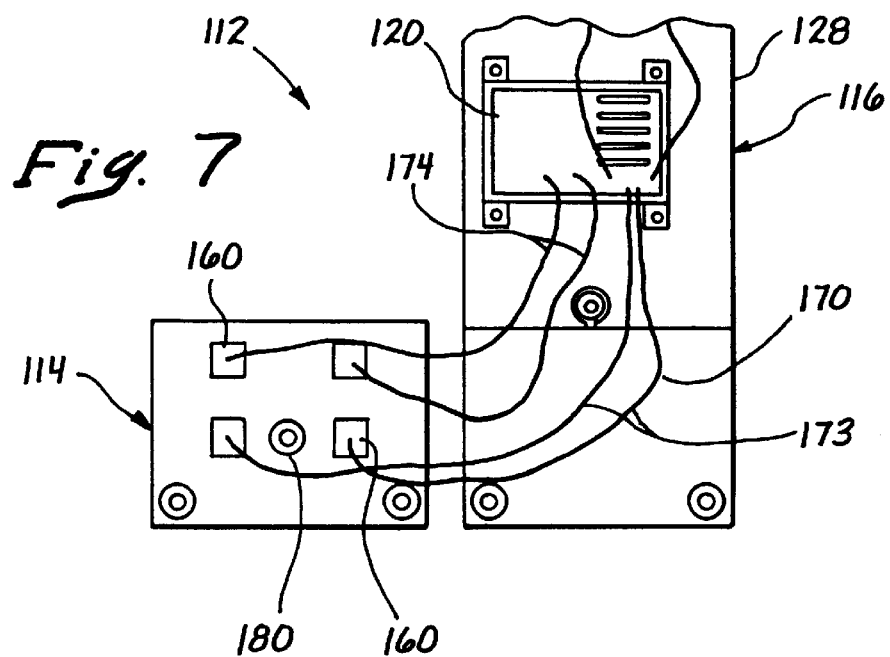
FIG. 7 is a rear plan view of the embodiment shown in FIG. 6.
Figure 8:
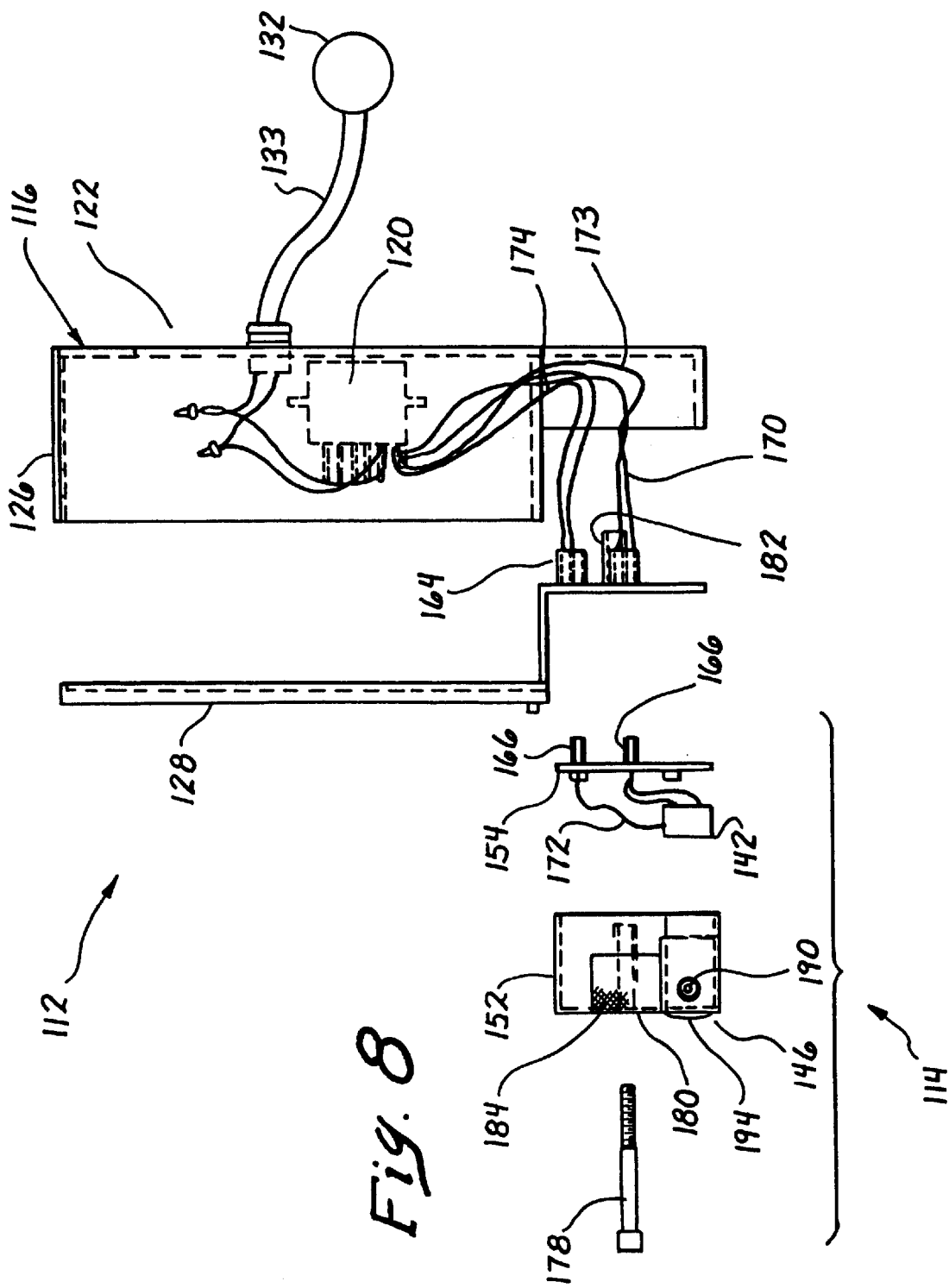
FIG. 8 is an exploded view of the embodiment shown in FIG. 6.

Another advantageous embodiment of the present invention is shown in FIGS. 6, 7 and 8. In this embodiment, the ozone generator 12 of the spa purifying apparatus 10 shown generally in FIG. 1, may be replaced with the ozone generator shown generally at 112.

The ozone generator 112 comprises a chip electrode assembly 114 that is adapted to be removably coupled to a power supply assembly 116.

More specifically, the power supply assembly 116 includes a power supply 120 housed and contained within a main housing or enclosure 122 comprising a main enclosure base 126 and a main enclosure cover 128. The power supply 120 includes electrical transformer such as described hereinabove, which processes electrical power from a power source (line power of 110–120 V, or high voltage power e.g. 220–240 V) through molded plug 132 and power cord 133.

Advantageously, the chip electrode assembly 114 is adapted to be removably coupled to the power supply assembly 116. More specifically, the chip electrode assembly includes a chip electrode 142, for example a corona discharge chip, shown in FIG. 8, separately enclosed from, and removably coupled to, the power supply assembly 116. Preferably, the chip electrode 142 is housed in a separate housing or enclosure 146, hereinafter referred to as a chip electrode enclosure, that includes a body portion 152 and a cover portion 154. Both the main enclosure 122 and the chip electrode enclosure 146 may be made from any suitable material or materials of construction. The chip electrode enclosure portions 152 and 154 may be soldered together such that when the replacement chip electrode assembly 114 is provided to a customer/consumer, the chip electrode 142 itself is inaccessible.

Importantly, electrical connectors 160, adapted to provide electrical connection between the power supply 120 and the chip electrode 142 are provided which are structured to be easily disengaged, thus facilitating removal of the chip electrode assembly 114.

For example, each electrical connector 160 comprises an electrical contact, for example a receptacle 164 and cooperating pin 166, integrated with, or mounted on, the main enclosure 122 and the chip electrode enclosure 146 respectively. Electrical wires 170 and 172 provide electrical connection from power supply 120 and chip electrode 142 to receptacles 164 and pins 166, respectively, as shown. Contact surfaces of the integrated receptacles 164 and pins 166 may be made of copper or other suitable conductive material.

Turning now specifically to FIGS. 6 and 7, an example of electrical connections between the cell electrode assembly 114 and the power supply assembly 116 is shown. More specifically, FIG. 7 shows a diagrammatical example of the electrical wires 170 from the power supply 120 to four sets of connectors 160 (i.e. coupled pins and receptacles). The electrical wires 170 may more specifically comprise two 120V wires 173, and two (optional) high voltage wires 174.

Means for securing mechanical and electrical attachment between the power supply assembly 116 and the chip electrode assembly 114 is preferably provided. This may be achieved by a thumb screw 178 for example, adapted enable easy manual coupling and uncoupling of the assemblies 114, 116. As shown in FIGS. 6 and 8, apertures 180 are provided in both the body portion 152 and cover portion 154 of chip electrode enclosure 146. Similarly, threaded receptacle 182 is provided in the cover portion 128 of the main enclosure 122, wherein the apertures 180 and threaded receptacle 182 are adapted to receive the thumb screw 178 when the assemblies 114, 116 are properly aligned. It can be appreciated that the thumb screw 178 provides means for securing mechanical attachment of the chip electrode assembly to the main enclosure as well as securing electrical contact between the integrated pins 166 and receptacles 164. It should also be appreciated that other suitable means of securing the assemblies 114, 116 may alternatively be provided. For example, suitable structure (not shown) may be included for enabling the chip electrode assembly 114 to be "snap fitted" onto the power supply assembly 116.

Preferably, the chip electrode enclosure 146 includes indented, grip relief surfaces 184 for facilitating the manual removal of the chip electrode assembly 114. Similar to as described hereinabove, with respect to the ozone generator embodiment shown in FIGS. 2–5, the chip electrode assembly 114 includes ozone supply outlet 190 to be connected to ozone conduit/supply tubing 80 (see FIG. 1). The ozone supply outlet 190 preferably comprises a barb member designed and structured to accommodate two different, standard tubing sizes (e.g. ¼ inch diameter and ⅜ inch diameter).

The embodiment shown in FIGS. 6, 7 and 8 is designed to enable a user (e.g. spa owner) to easily remove and replace a worn chip electrode with a new chip electrode without the need to open the power supply assembly thereby exposing the power supply/transformer. Instead, when the chip electrode becomes worn or spent, which may be evidenced, for example, by a visually observable loss of glow through a clear view window 194, the spa owner will need perform the following simple procedure. After disconnecting cord 133 from power source, the user will (1) disconnect ozone supply tubing 80 (FIG. 1), (2) unscrew the thumbscrew 178, (3) remove the old chip electrode assembly 114, (4) install a new chip electrode assembly by aligning and connecting pins 166 with receptacles 164, (5) secure the assemblies 114, 116 by means of the thumbscrew 178, and (6) reconnect ozone supply tubing 80. Preferably, the assemblies 114, 116 are structured accordingly to prevent misalignment between the pins 166 and receptacles 164. In the embodiment shown, the pins 166 and receptacles 164 can not be misaligned.

Thus, it should be appreciated that a worn chip electrode assembly may safely and easily be removed and replaced with a new chip electrode assembly without need for a user/consumer to either open the power supply enclosure or remove the ozone generator from its location. Replacement chip electrode assemblies in accordance with this embodiment may be made available at relatively low cost.

The present ozone generator provides a very compact structure which: is easily and conveniently mounted for use in a spa/jetted tub application; requires relatively reduced amounts of maintenance; is cost effective to produce and use; and effectively and efficiently produces ozone in sufficient quantities to perform the desired spa/jetted tub purification/sanitation service.

While this invention has been described with respect to various specific examples and embodiments, it is to be understood that the invention is not limited thereto and that it can be variously practiced within the scope of the following claims.

What is claimed is:

1. An ozone generator apparatus comprising:
    a power supply assembly including a main enclosure and a power supply enclosed therein;
    a chip electrode assembly including
        a chip electrode structured to produce ozone, and
        a housing enclosing the chip electrode separately from the power supply, the chip electrode assembly being coupled to the main enclosure without being introduced
        therein; and
    electrical connectors adapted to provide electrical connection between the power supply and the chip electrode, the chip electrode assembly being structured to be manually coupled and electrically connected to the power supply assembly without introducing the chip electrode into the main enclosure.

2. The ozone generator apparatus of claim 1 wherein the chip electrode assembly is structured to be replaceable with a replacement chip electrode assembly after the chip electrode assembly is decoupled from the power supply assembly.

3. The ozone generator apparatus of claim 1 wherein the chip electrode assembly housing includes a transparent window located to permit direct viewing of the chip electrode.

4. The ozone generator apparatus of claim 1 wherein the electrical connectors include power supply connectors within the power supply assembly and chip electrode connectors within the chip electrode assembly.

5. The ozone generator apparatus of claim 4 wherein the power supply connectors comprise receptacles or pins and the chip electrode connectors comprise complementary pins or receptacles adapted to cooperatively engage the power supply connectors.

6. The ozone generator apparatus of claim 1 wherein the power supply includes a transformer sized, adapted and located to control electric power provided to the chip electrode.

7. The ozone generator apparatus of claim 6 wherein the electrical connectors include power supply connectors within the power supply assembly and chip electrode connectors within the chip electrode assembly.

8. The ozone generator apparatus of claim 7 wherein the power supply connectors comprise receptacles and the chip electrode connectors comprise pins adapted to cooperatively engage the receptacles.

9. The ozone generator apparatus of claim 6 wherein the transformer is structured to be supplied with power of about 100 volts to about 130 volts.

10. The ozone generator apparatus of claim 1 wherein the chip electrode is a corona discharge chip electrode.

11. The ozone generator apparatus of claim 1 further comprising a potentiometer structured and positioned relative to the power supply assembly to control an amount of ozone produced.

12. An apparatus for purifying water in a spa or jetted tub, the apparatus comprising:
    an ozone generator including
        a power supply assembly including a main enclosure and a power supply enclosed therein, and
        a chip electrode assembly including
            a chip electrode structured to produce ozone,
            a housing enclosing the chip electrode separately from the power supply, the chip electrode assembly being coupled to the main enclosure without being introduced therein, and electrical connectors adapted to provide electrical connection between the power supply and the chip electrode, the chip electrode assembly being structured to be manually coupled and electrically connected to the power supply assembly introducing the chip electrode into the main enclosure; and a transfer assembly cooperating with said ozone generator to pass ozone produced by the chip electrode assembly to water in the spa or jetted tub.

13. The apparatus of claim 12 wherein the chip electrode assembly is structured to be replaceable with a replacement chip electrode assembly after the chip electrode assembly is decoupled from the power supply assembly.

14. The apparatus of claim 12 wherein the chip electrode assembly housing includes a transparent window located to permit direct viewing of the chip electrode.

15. The apparatus of claim 12 wherein the electrical connectors include power supply connectors within the power supply assembly and chip electrode connectors within the chip electrode assembly.

16. The apparatus of claim 15 wherein the power supply connectors comprise receptacles or pins and the chip electrode connectors comprise complementary pins or receptacles adapted to cooperatively engage the power supply connectors.

17. The apparatus of claim 12 wherein the power supply includes a transformer sized, adapted and located to control electric power provided to the chip electrode.

18. The apparatus of claim 17 wherein the electrical connectors include power supply connectors within the power supply assembly and chip electrode connectors within the chip electrode assembly.

19. The apparatus of claim 18 wherein the power supply connectors comprise receptacles and the chip electrode connectors comprise pins adapted to cooperatively engage the receptacles.

20. The apparatus of claim 17 wherein the transformer is structured to be supplied with power of about 100 volts to about 130 volts.

21. The apparatus of claim 11 wherein the chip electrode comprises a corona discharge chip electrode.

22. The apparatus of claim 12 further comprising a potentiometer structured and positioned relative to the power supply assembly to control an amount of ozone produced.

23. The apparatus of claim 12 wherein the ozone generator is effective to produce sufficient ozone to purify the water in a spa or jetted tub containing an amount of water in a range of about 50 gallons to about 5000 gallons.

24. The apparatus of claim 12 wherein said transfer assembly includes a water pump, an adductor assembly having an inlet and an outlet and a transfer conduit structured to provide a passage for ozone-containing gases between the ozone generator and the adductor assembly, the water pump being positioned to pump water from the spa or jetted tub through the adductor assembly and the transfer conduit being positioned so that the passage of water through the adductor assembly causes ozone-containing gases from the ozone generator to pass through the transfer conduit into and through the adductor assembly.

25. An apparatus for purifying water in a spa or jetted tub, the apparatus comprising:

an ozone generator including a power supply assembly including a main enclosure, and a transformer enclosed within the main enclosure, a chip electrode assembly coupled to the power supply assembly, the chip electrode assembly including a chip electrode housing, and a chip electrode structured to produce ozone from air and enclosed within the chip electrode housing, the chip electrode housing including a transparent window for enabling visual observation of the chip electrode contained therein, and electrical connectors adapted to provide electrical connection between the power supply and the chip electrode, the chip electrode assembly being structured to be manually coupled and electrically connected to the power supply assembly without introducing the chip electrode into the main enclosure; and a transfer assembly cooperating with said ozone generator to pass ozone produced by the chip electrode assembly to water in the spa or jetted tub.

* * * * *

UNITED STATES PATENT AND TRADEMARK OFFICE
CERTIFICATE OF CORRECTION

PATENT NO.    : 6,331,279 B1
DATED         : December 18, 2001
INVENTOR(S)   : Martin It is certified that error appears in the above-identified patent and that said Letters Patent is hereby corrected as shown below:

Column 2,
Line 10, "jetted tube," should read -- jetted tub, --.

Column 3,
Line 38, "comprises a electrical" should read -- comprises an electrical --.

Column 4,
Line 47, "complimentary cover holes 22" should read -- complementary cover holes 22 --.
Line 49, "housing body 18," should read -- housing body 16, --.

Column 7,
Line 4, "adapted enable" should read -- adapted to enable --.

Column 8,
Line 15, "electrical connectors" should not start a new paragraph.

Column 9,
Line 40, "21. The apparatus of claim 11" should read -- 21. The apparatus of claim 12 --.

Signed and Sealed this

Tenth Day of June, 2003

JAMES E. ROGAN
*Director of the United States Patent and Trademark Office*